(12) United States Patent
Steding et al.

(10) Patent No.: US 11,285,432 B2
(45) Date of Patent: Mar. 29, 2022

(54) FLUE GAS EMISSIONS REDUCTION TECHNOLOGY

(71) Applicant: Paul Steding, Kardinya (AU)

(72) Inventors: Paul Steding, Kardinya (AU); Richard Norman McDaniell, Twickenham Middlesex (GB)

(73) Assignee: Paul Steding, Kardinya (AU)

( * ) Notice: Subject to any disclaimer, the term of this patent is extended or adjusted under 35 U.S.C. 154(b) by 59 days.

(21) Appl. No.: 16/490,242

(22) PCT Filed: Mar. 2, 2018

(86) PCT No.: PCT/AU2018/050193
§ 371 (c)(1),
(2) Date: Aug. 30, 2019

(87) PCT Pub. No.: WO2018/157216
PCT Pub. Date: Sep. 7, 2018

(65) Prior Publication Data
US 2020/0070088 A1    Mar. 5, 2020

(30) Foreign Application Priority Data
Mar. 3, 2017  (AU) ................................ 2017900746

(51) Int. Cl.
*B01D 53/14*   (2006.01)
*B01D 53/32*   (2006.01)
*B01D 53/62*   (2006.01)

(52) U.S. Cl.
CPC ......... *B01D 53/1456* (2013.01); *B01D 53/32* (2013.01); *B01D 53/62* (2013.01);
(Continued)

(58) Field of Classification Search
CPC .... B01D 53/1456; B01D 53/32; B01D 53/62; B01D 2252/103; B01D 2257/404; B01D 2258/0283; B01D 2259/814
(Continued)

(56) References Cited

U.S. PATENT DOCUMENTS 1,831,731 A * 11/1931 Al ......................... B01D 53/62
423/230
2007/0169625 A1 7/2007 Aines et al.
(Continued)

FOREIGN PATENT DOCUMENTS

WO  WO-2007015684 A1 *  2/2007  ................ C02F 1/48
WO      2011147085 A1     12/2011
WO      2017018947 A1      2/2017

OTHER PUBLICATIONS

International Preliminary Report on Patentability for Application No. PCT/AU2018/050193 dated Jul. 2, 2019, 6 pages.
(Continued)

*Primary Examiner* — Anita Nassiri-Motlagh
(74) *Attorney, Agent, or Firm* — Seyfarth Shaw LLP

(57) ABSTRACT

The disclosure provides a method of treating flue gas that has one or more components. The method comprises passing a solution through both a magnetic field and an electric field to form an activated solution. The method also comprises contacting the activated solution with the flue gas so that the one or more components of the flue gas are at least partially absorbed by the activated solution to form a residue solution.

12 Claims, 3 Drawing Sheets

(52) U.S. Cl.
CPC .. *B01D 2252/103* (2013.01); *B01D 2257/404* (2013.01); *B01D 2257/504* (2013.01); *B01D 2258/0283* (2013.01); *B01D 2259/814* (2013.01)

(58) Field of Classification Search
USPC ......................................................... 423/220
See application file for complete search history.

(56) References Cited

U.S. PATENT DOCUMENTS

| | | | |
|---|---|---|---|
| 2012/0121489 A1 | 5/2012 | Chew | |
| 2012/0325092 A1* | 12/2012 | Shimamura | F23J 15/04 96/251 |
| 2014/0138247 A1* | 5/2014 | Aanensen | C02F 1/4608 204/571 |
| 2014/0374236 A1* | 12/2014 | Moore | C02F 1/487 204/155 |

OTHER PUBLICATIONS

International Search Report for Application No. PCT/AU2018/050193 dated Jun. 1, 2018, 3 pages.

\* cited by examiner

FLUE GAS EMISSIONS REDUCTION TECHNOLOGY

CROSS REFERENCE TO RELATED APPLICATIONS

This is a National Stage application of, and claims priority to, PCT/AU2018/050193, filed Mar. 2, 2018, which claims priority to AU Patent Application No. 2017900746, filed Mar. 3, 2017, the disclosures of which are incorporated herein by reference in their entirety.

TECHNICAL FIELD

This disclosure relates generally to methods and systems of reducing greenhouse gases, such as, but not limited to, $CO_2$, CO, NO, $NO_x$ and $SO_x$, from flue gases.

BACKGROUND

Issues of greenhouse gas emissions are becoming an ever increasing problem. The main human contributor to this issue is the unchecked emission of greenhouse gases from power stations, refineries, industrial power and heat generation systems, shipping, cement factories and Kilns, waste incinerators and any other industrial systems or processes for which greenhouse gasses are emitted (collectively referred to flue gas emissions systems or processes). There is a growing demand for power everywhere and over 60% of the world's power is generated by thermal power stations such as fossil fuel (e.g. coal)-fired power stations. This figure is unlikely to change significantly over the next 20 years because fossil fuels are cheap, plentiful and the technology to derive power from it is well established.

Ways to reduce greenhouse gas emissions, in particular $CO_2$ emissions, include the use of nuclear power. Nuclear power does not generate $CO_2$, but there are still many issues associated with storing nuclear waste which prevents it from being widely used. Carbon sequestration is another technique being investigated as a way of reducing or capturing $CO_2$ emitted from fossil fuel-fired power stations from entering into the atmosphere.

However, carbon sequestration is very expensive and finite in capacity. It is not always scalable and as such can generally only be targeted at mid to large scale $CO_2$ producers, for example power plants that emit 25,000 tonnes of $CO_2$ p.a. or more. This leaves a number large of smaller scale $CO_2$ producers untouched and/or unregulated.

Further, flue gas 'scrubbing' with lime or limestone based reagents to remove $SO_2$ or HCl from flue gases are already well-known but they have little effect on $NO_x$ gases or even $CO_2$ which is seen as the main global warming culprit.

Given the global consumption of energy is increasing, there will a need for alternatives to help reduce $CO_2$ emissions.

It is to be understood that, if any prior is referred to herein, such reference does not constitute an admission that it forms a part of the common general knowledge in the art, in Australia or any other country.

SUMMARY

Disclosed is a method of treating flue gas that has one or more components, the method comprising: passing a solution through both a magnetic field and an electric field to form an activated solution, and contacting the activated solution with the flue gas so that the one or more components of the flue gas are at least partially absorbed by the activated solution to form a residue solution.

Without being bound by theory, it is thought that activating the solution, such as water, helps to increase the solubility of solutes such as ions in the solution. For example, for sparingly soluble minerals such as calcite, it is thought that the presence of a magnetic field and an electric field helps to disorder hydrated $CaCO_3$ aggregates, forming liquid emulsions to convert them into different prenucleation clusters and hence different structures of crystallization. This helps to increase the number of crystal edges and corners (i.e. the surface area of the aggregates increases) which in turn helps to increase the dissociation and solubility. This means that the number of ions present in solution may increase, which may lead to an increase in reactivity of the activated solution with flue gas. When the solutes are ions, activation may help to increase the hydration radius of each ion and keep each ion in solution for longer. This may help to increase the ability of components of the flue gas such as $CO_2$ to be converted or absorbed by the activated solution e.g. be solubilised to form $CO_3^{2-}$. Put another way, the partitioning coefficient of the components that comprise flue gas between the gas phase and aqueous phase is shifted towards the aqueous phase. If carbon particulates are present in the flue gas, they can aggregate in the residue solution. If the aggregates are larger than 100 nm, they can begin to refract light and change the colour of the water. The activated solution may react with one or more components of the flue gas. For example, the activated solution may help to reduce $CO_2$ into carbon and oxygen and/or convert $CO_2$ into $CO_3^{2-}$ which may then further react with ions to form insoluble minerals.

The term "absorb" is to be interpreted broadly to include interaction with the activated solution with the flue gas components e.g. absorption of flue gas components as well as conversion of flue gas components into other forms e.g. $CO_2$ into $CO_3^{2-}$. For the conversion to occur, the flue gas components generally need to be absorbed before conversion can take place.

In an embodiment, the magnetic field may be provided from a magnetic coil. The coil may generate a magnetic flux density of between 0.0002 nT to 10 T, and every other sub range between. For example, the coil may generate a magnetic flux density of between about 1 mT to 1 T, about 0.01 µT to 1 T, about 0.01 µT to 1 mT, about 1 µT to 200 µT, and about 0.01 µT to 200 µT. In some embodiments, flux density greater than 10 T may be used. In some embodiments, the magnetic field may be provided by the earth's magnetic field. The skilled person would understand that the flux density can be expressed in other units such as Webers (Wb) per $m^2$ and Gauss (G).

In an embodiment, the electric field is in the form of an oscillating sinusoidal waveform generated at a first antenna or dipole and an oscillating sinusoidal waveform generated second antenna or dipole. The sinusoidal waveform generated at the first antenna or dipole may be 180° out of phase with the sinusoidal waveform generated at the second antenna or dipole. The sinusoidal waveform may be provided as a square waveform in some embodiments. The first and the second antenna or dipole may be associated with an electric field generator. The magnetic field may exist between the first antenna or dipole and the second antenna or dipole. A frequency of the oscillating electric field may range from 0.3 Hz to 2,000 THz and every other sub range between, for example, 0.3 Hz to 100 MHz, 0.3 Hz to 1 MHz, 0.3 Hz to 500 kHz, 0.3 Hz to 300 kHz, and 0.3 Hz to 100 kHz.

In an embodiment, contacting the activated solution with the flue gas may comprise injecting the activated solution into the flue gas as a vapour and/or mist. The vapour may comprise mist. The activated solution may be injected into the flue gas using an aerosol generator. The solution may be aqueous-based. The solution may be water. The water may contain additives to assist in adsorption and/or conversion of the flue gas components. The additives may include salt(s) or other solutes. The water may be seawater. In some embodiments, the solution is in the form of steam, and the steam is activated prior to contact with the flue gas. Put another way, the solution is converted to steam before it is activated. In some other embodiments, the solution is first activated and then converted to steam, where the activated steam is then contacted with the flue gas.

In an embodiment, the method may comprise collecting the residue solution. The at least partially absorbed one or more components of the flue gas may be extracted from the residue solution. For example, carbon particulates may be collected and sent for further processing in the production of carbon-based materials such as carbon nanotubes. When particulates are absorbed by the activated solution, they may be suspended rather than absorbed and converted into other forms. Alternatively, the recovered carbon particulates may be used as a feedstock for a thermal power station.

In an embodiment, the method may be continuously operated. However, in some embodiments the method may be operated in a cyclical manner, such as in an on-off manner. The method may respond to increases in flue gas emissions by increasing a rate at which the activated solution is contacted with the flue gas.

Also disclosed is a system for treating flue gas that has one or more components, comprising: a conduit that is configured to deliver a solution to flue gas; an electric field generator being associated with the solution being delivered to the flue gas, the electric field generator being configured to generate an electric field; a magnetic field associated with the solution being delivered to the flue gas; wherein the system is configured so that the solution being delivered to the flue gas is activated by the electric field and magnetic field to form an activated solution, the activated solution being passable through the opening to contact the flue gas to at least partially absorb one or more of the components of the flue gas to form a residue solution.

The magnetic field may be provided by a magnetic generator that is configured to generate a magnetic field. In some embodiments the magnetic field is provided by the earth's magnetic field. In an embodiment, the magnetic field generator may be a magnetic coil that is configured to generate a magnetic field between 0.0002 µT to 10 T, and every other sub range between. For example, the coil may generate a magnetic flux density of between about 1 mT to 1 T, about 0.01 µT to 1 T, about 0.01 µT to 1 mT, and about 0.01 µT to 200 µT. A magnetic flux greater than 10 T may be used. In an embodiment, the electric field generator may have a first antenna or dipole and a second antenna or dipole for generating an oscillating sinusoidal waveform therebetween. In an embodiment, the magnetic field generator may be positioned between the first antenna or dipole and the second antenna or dipole. This may help to improve the efficiency of activating the solution.

In an embodiment, a frequency of the oscillating electric field may range from 0.3 Hz to 2,000 kTHz, and every other sub range between, for example, 0.3 Hz to 100 MHz, 0.3 Hz to 1 MHz, 0.3 Hz to 500 kHz, 0.3. Hz to 300 kHz, and 0.3 Hz to 100 kHz. In an embodiment, the opening may be an apparatus for generating a vapour and/or mist of activated solution in the flue gas. For example, the apparatus may be a nozzle that generates a fine mist.

The electric field generator and the magnetic field generator may be formed in a single device. For example, the device may be that as described in US2014/0374236. In an embodiment, the device comprises two antennae, an enclosure for holding a liquid including a solvent and a solute, a generator operatively connected to the two antennae to generate an oscillating voltage in each antenna, wherein each voltage in out of phase with the other to create an oscillating electric-field, and the liquid in the enclosure being subjected to the electric-field in the presence of a magnetic field to change the chemical and/or physical properties of the solute, without the liquid contacting the two antennae. The solution may be activated using the electric field and magnetic field as described in US2014/0374236.

In an embodiment, the system may further comprise a collection port for collecting the residue solution. The collection port may allow the at least partially absorbed one or more components of the flue gas to be collected and further refined. In an embodiment, the system may be configured to continuously treat flue gas.

In an embodiment, the electric field generator and the magnetic field generator may be positioned on an outside of the conduit, and the solution may be configured to pass on an inside of the conduit. Since some thermal power stations already have conduits e.g. for scrubber systems, the electric field generator and the magnetic field generator may be easily installed to existing thermal power stations.

In an embodiment, the system may further comprise a pump for pumping the activated solution through the conduit.

The method and system may be used in a fossil-fuel, such as coal-fired, power station. In these embodiments, the solution may be activated prior to entry into a boiler, which would generate activated steam, which can then be contacted with flue gas. Alternatively, the system may be fitted directly to one or more flue stacks. In this way, the disclosure also provides a flue fitted with the system as set forth above. More than one system may be fitted to the flue.

Also disclosed is a system as set forth above used to perform the method as set forth above.

The electric field generator and magnetic field generator may be installed by relatively low technology installers without the need, in most cases, for a fossil fuelled-fired power plant having to shut down. The installation may be similar to the installation of a water reticulation system. The power requirement to operate the system and method as set forth above may be calculated for any operation and may be based on the size of the pump and reticulation combination as required for the designated task.

The power required to operate the system and method as set forth above may be minimal and may be sourced from a suitable solar panel/wind generator and battery combination at a low voltage if required. Standard grid or generator power can be used to power the reticulation of the water—power calculations may be available once the technical details of the plant and emissions are known such as unit size, stack dimensions, gas composition including volume and temperature etc.

The system and method as set forth above may be scalable, where the larger the flue and amount of flue gas, the larger the amount of activated water required.

The term flue gas is used generally to include gas emissions, including, but not limited to, CO, $CO_2$, $SO_2$, NO and $NO_x$, produced from combustion of a combustible fuel. For example, the method or system may be used to treat greenhouse gas emissions from sources such as power stations, refineries, industrial power and heat generation systems, shipping and waste incinerators, cement factories, lime factories, kilns, commercial and pleasure craft. Therefore, the method and system as set forth above may be used to treat flue gas in a variety of applications.

DETAILED DESCRIPTION

Figure 1:
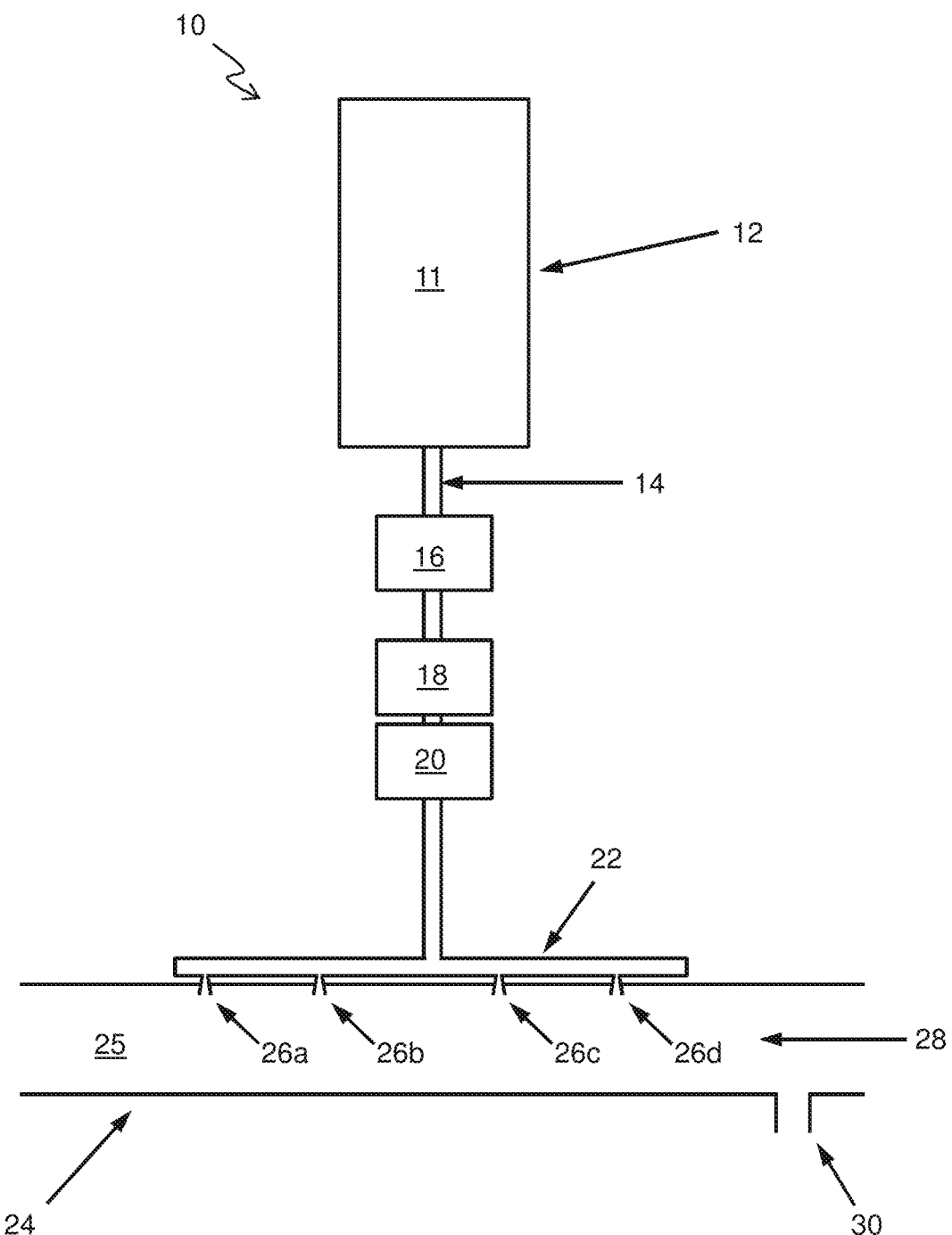
FIG. 1 shows an embodiment of a system for treating flue gas.

An embodiment of a system 10 for treating a flue gas is shown in FIG. 1. A solution, in the form of water 11, is held in reservoir 12 and is in fluid communication with conduit 14. A pump 16 is connected to conduit 14 to pump water from the reservoir 12 through a magnetic field generator 18 and an electric field generator 20. The magnetic field generator 18 and electric field generator 20 are positioned around an exterior surface of the conduit 14 so that they are coaxially arranged with the conduit 14. The conduit 14 passes first through magnetic field generator 18 and then the electric field generator 20, but in other embodiments this order is reversed, or alternatively, the magnetic field generator 18 and an electric field generator 20 are provided in the same device. In one embodiment, the magnetic field generator 18 is positioned between first and second antenna of the electric field generator 20. In some embodiments, more than two antennas are used. Alternatively, some embodiments use one or more antennae. The magnetic field generator 20 is a magnetic coil that is configured to generate a magnetic flux density of between 0.0002 µT to 10 T. The electric field generator is configured to generate an oscillating frequency from about 0.3 Hz to 2,000 kTHz. Further, in the embodiment of FIG. 1, the electric field generator is configured to generate an oscillating sinusoidal waveform generated at a first antenna or dipole and a second antenna or dipole, where the sinusoidal waveform generated at the first antenna is 180° out of phase with the sinusoidal waveform generated at the second antenna.

In some embodiments, the magnetic field generator 18 is not required as the system 10 can rely on background magnetic fields, such as the earth's magnetic field. The water can be salt water, or at least be saltier than drinking water. In some embodiments, potable e.g. tap water is used in system 10.

The conduit 14 extends from electric field generator 20 into secondary conduit 22. A plurality of openings in the form of misting nozzles 26 are in fluid communication with the secondary conduit 22. The misting nozzles 26 pass through a wall of a flue 24 so that they are in contact with an internal volume 25 of the flue 24. In use of the system 10, water is passed, through activation of the pump 16, through the magnetic field generator 18 and an electric field generator 20 to activate the water. This activated water is then delivered into the internal volume 25 as a fine mist so that it can contact flue gas, as represented by arrow 28, passing through the internal volume. The specific arrangement of the flue 24, misting nozzles 26, conduit 14 and secondary conduit 22 in FIG. 1 is exemplary only and can take on many other forms. For example, in some embodiments misting nozzles 26 are attached to conduit 14 and secondary conduit 22 is not used. In other embodiments, there are more or less than four misting nozzles. In other embodiments, the misting nozzles are provided as separate groups to treat separate sections of the flue 24. In other embodiments, more than one system 10 is fitted to the flue 24 to treat flue gas 28. The flue gas 28 can be under pressure to drive it through the flue or a fan or pump can be used to drive the flow of the flue gas 28.

Once the fine mist of activated water contacts the flue gas 28, components of the flue gas such as particulate carbon, $CO_2$, CO, NO, $NO_x$, and $SO_x$ are absorbed by the activated mist to form residue mist which then condenses into residue water. In use of the system 10, a volume of activated mist will be delivered to the internal volume 25, with the total volume being dependent on the dose rate of activated water and the type of flue gas to be treated (e.g. the expected amount(s) of contaminates to be treated by the activated mist). To prevent flooding of the flue 24, a tap 30 is provided to drain the residue water. The tap 30 in some embodiments is provided as a sump to allow residue water to collect but prevent flue gas 28 from escaping the flue 24. Although not shown in FIG. 1, the residue water is then removed and components in the residue solution, such as particulate carbon, are then able to be extracted and treated and/or reused.

In some embodiments the water 11 is delivered via gravity, which may eliminate the requirement for pump 16. Instead, a valve of similar can be used to control a flow rate of the water through conduit 14. The water 11 can be continuously pumped through the magnetic field generator 18 and electric field generator 20 to treat the flue gas 28, or a pulsed pumping method may be used.

In an embodiment (not shown), the activated water can be passed through a boiler associated with a power station after the magnetic field generator 18 (if provided) and electric field generator 20. The secondary conduit 22 or similar is positioned downstream of the boiler and the flue 24 is associated with the boiler.

Figure 3:
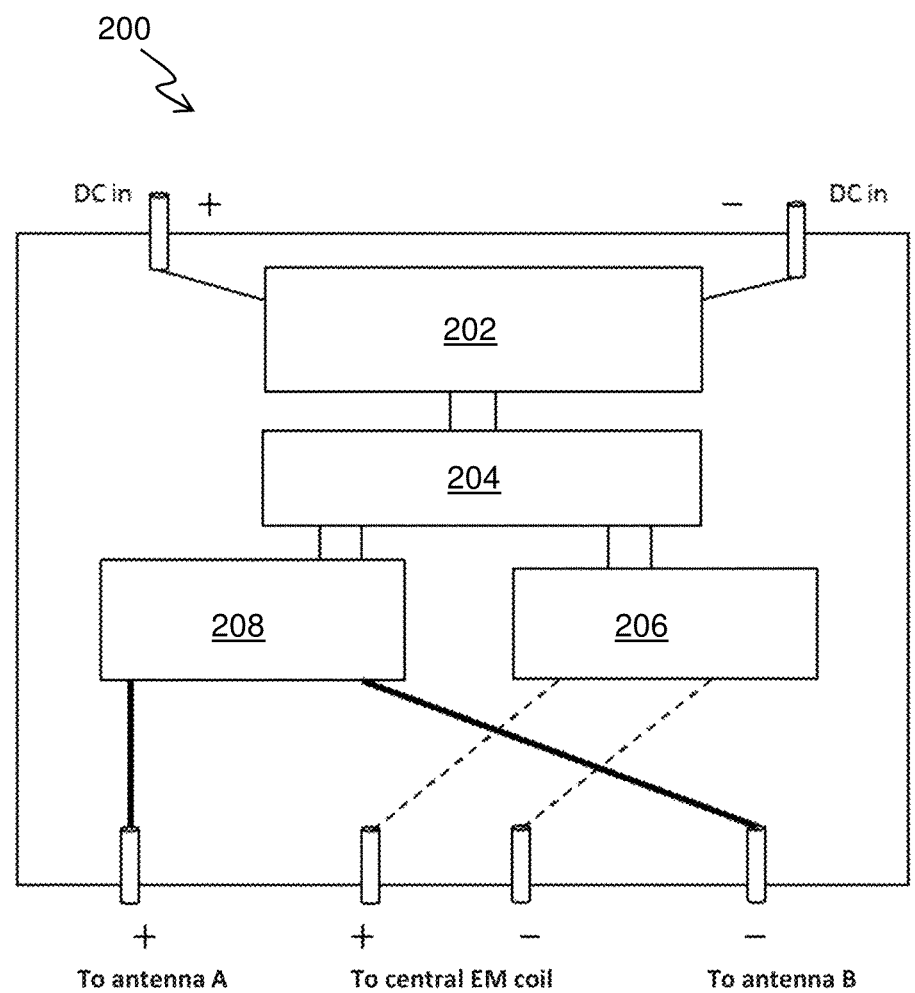
FIG. 3 shows an embodiment of a device used for treating flue gas.

In an embodiment, a device 200 is used to provide the magnetic field and electric field, as shown in FIG. 3. A waveform supplied to the magnetic field (EM) generator 206 of the device 200 is generated by a wave duplicator and phase generator 204, which also supplies the waveform to the electric field generator 208 (FIG. 3.). The input to the wave duplicator and phase generator 204 is supplied by a wave generator with tunable frequency output module 202. The arrangement of the device 200 helps to ensure that the frequency of the magnetic field coil waveform is the same as the frequency of the antennae waveform. This arrangement can also help to ensure that the phase of the magnetic field coil is the same as that of one of the antennae. In the embodiment of FIG. 3, the magnetic coils associated with the magnetic field generator are positioned between the antennae of the electric field generator.

Figure 2:
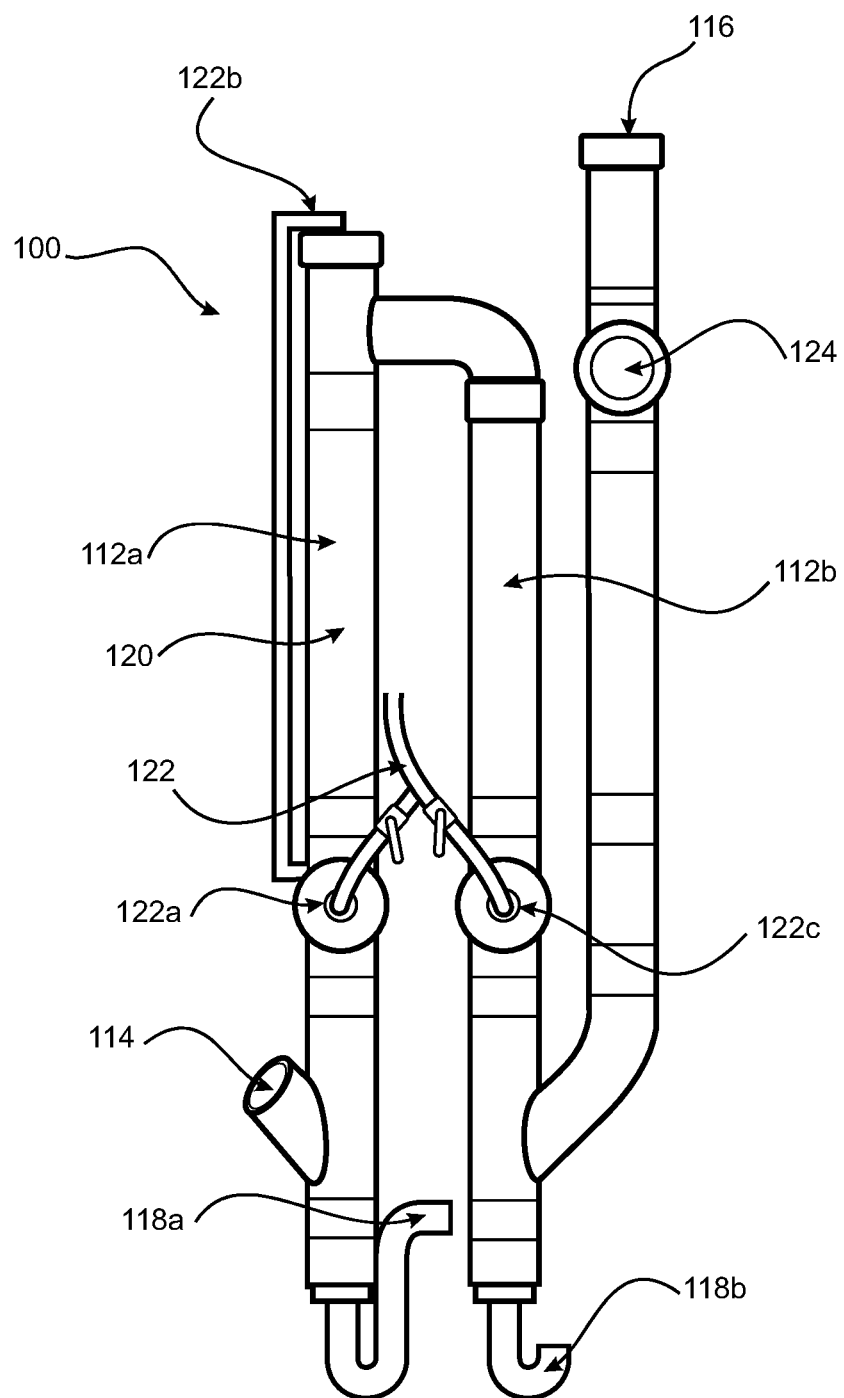
FIG. 2 shows another embodiment of a system for treating flue gas.

FIG. 2 shows another embodiment of a system 100 for treating flue gas. In system 100, the flue gas is configured to travel through flue 112. Flue 112 has a smoke inlet 114 that allows ingress of flue gas into flue 112. In use, the smoke inlet 114 would be connected to an exhaust outlet for a combustion chamber. The combustion chamber is used to combust a combustible fuel. Therefore, exhaust from the combustion chamber is funnelled out of the outlet and into smoke inlet 114. The term combustion chamber is used broadly to include combustion chambers from power stations, refineries, industrial power and heat generation systems, shipping and waste incinerators, cement factories, lime factories, kilns, commercial and pleasure craft.

Flue 112 has an extraction fan 116 to assist in pumping flue gas through flue 112. Extraction fan 116 is not required in all embodiments to pump flue gas through flue 112. The flue 112 also has a collection port in the form of sump 118 to act as residual capture points for collecting residue solution. The general U-shape of flue 112 allows residue solution to pool in the sump 118 without restricting flow of the flue gas through flue 112.

The flue 112 has a primary washing chamber 112a and a secondary washing chamber 112b. However, there can be any number of washing chambers, and the total number of washing chambers will be dependent on the amount and type of flue gas to be treated.

A viewing window 124 is positioned upstream of fan 116 to allow visual inspection of the treated flue gas and to allow for sensors (not shown) to monitor the composition of the flue gas in the presence of the activated mist. In some embodiments, the sensors are in communication with a pump used to pump water through pipe 120. For example, if the sensor detects that the level(s) of components in the flue gas post-treatment are above a threshold value, the pump can be instructed via programmable computer logic (PLC) to increase the pumping rate to increase the rate of activated vapour and/or mist formation to increase the rate of absorption of flue gas components.

A conduit in the form of pipe 120 is positioned around flue 112. One end of pipe 120 is in communication with a reservoir that can hold a volume of solution such as water (not shown). Pipe 120 has openings in the form of misting nozzles 122. In the embodiment of FIG. 2, the system has four misting nozzles placed along a length of flue 112, but other embodiment have more or less than four misting nozzles. The number of misting nozzles depends on the size of the flue 112 and the amount of flue gas to be treated. Water traveling through pipe 120 exits the misting nozzles to form a mist of water in the flue 112, where the mist of water contacts any flue gas that is traveling through flue 112. In some embodiments, the openings are in the form that provides a vapour in addition to or in place of mist.

Prior to forming a mist of water, the water is passed through an electric field and a magnetic field to form an activated solution (not shown). In this way, the mist generated from the activated water can be considered an activated mist. The electric field is generated from an electric field generator and the magnetic field is generated from a magnetic field generator (not shown), or in some embodiments is provided as the earth's magnetic field. In the embodiment of FIG. 2, the solution is activated using an electric field and magnetic field as described in US2014/0374236. In some embodiments the water is activated as it is passed through pipe 112 prior to exiting misting nozzles 122. This allows water to be continually activated as needed. However, in some embodiments the water is activated in bulk, stored in the reservoir, and then pumped through pipe 120. In these embodiments, the water can be activated e.g. off-site and transported to the reservoir, or the water can be activated once in the reservoir.

The activated mist contacts the flue gas in use, which allows components of the flue gas such as particulate carbon, $CO_2$, CO, NO, $NO_x$, and $SO_x$ to be absorbed by the activated mist to form residue mist. The droplets of residue mist are then able to pool into sump 118 to form a residue solution. The residue solution is then removed and components in the residue solution, such as particulate carbon, are then able to be extracted and reused.

EXAMPLES

System

A stainless steel drum having a 525 cm diameter×460 cm height was fitted with a brazier and an air blower to aid combustion. A length of 125 mm flexible aluminium ducting was used to direct the flue gas from the combustion into the flue.

The flue similar to that described in FIG. 2 comprised one 100 mm×1000 mm chamber fitted with three misting sprays and one 100 mm×850 mm wash chamber fitted with a single misting spray. A U-bend configuration residual capture unit was configured below each washing chamber. This had the dual purpose of sealing the washing chamber from the atmosphere and providing a point from where a sample of used fluid could be drawn for analysis. The downstream end of the U-bend was vented to the atmosphere at a level that retained the seal to the washing chamber at a constant level while allowing overflow residual fluid to be collected for further analysis if necessary. This configuration automatically prevented the washing chamber from becoming flooded irrespective of the volume of fluid delivered by the spray nozzles.

The sampling chamber was a 100 mm×1300 mm tube fitted with a clear observation window and a sampling port 1150 mm from the fourth spray nozzle. The clear window was necessary to monitor and avoid fouling of a Unigas 3000+ probe and the position of the sample port satisfied the requirements for a thoroughly mixed sample while reducing the likelihood of the analyser probe becoming contaminated.

A 12 volt electrical circuit was designed to provide power to a 200 psi pump, 100 watt air blower and a rheostat controlled extraction fan which was fitted at the exhaust end of the apparatus to ensure positive flow through the system.

Tap water was treated with an electric field and magnetic field as described in US2014/0374236.

A new calibrated Unigas 3000+ Flue Gas Analyser configured to measure $O_2$, $CO_2$, CO, $SO_2$, NO and $NO_x$ was utilised for gas analysis.

Black Coal 1 kg of crushed black coal was ignited in the stainless steel burner and, with the assistance of a blown air source, was taken to over 385° C. whereupon the smoke effluent became relatively clear. This output was ducted through the flue and analysed using the Unigas 3000+ Flue Gas Analyser immediately prior to activating the spraying of the activated water. This reading was labelled the "Control Coal Smoke" sample.

The activated water was then pumped to the first wash chamber subjecting the burner output (smoke effluent) to the micro mist produced by three of the misting nozzles. The used residual fluid was collected in the first residual capture unit for further analysis. The washed smoke effluent flowed into the second wash chamber where it was subjected to the micro mist from the fourth spray nozzle. The residual from this chamber was collected in the second residual capture unit for possible further analysis.

The smoke effluent then entered the sampling chamber and was analysed via the Unigas 3000+ probe at the same port. This reading was labelled "Treated Coal Smoke" sample. The processed smoke effluent was finally released into the atmosphere through the extraction fan.

Gas sampling and analysis was conducted using the Unigas 3000+ Flue Gas Analyser. The data sought was a comparison between treated and raw (control) samples. To ensure that the sample smoke effluent properties remained uniform, a short time span between taking the samples was a prime requirement. The ability of the Unigas 3000+ to self-calibrate and continually analyse allowed the samples to be acquired within minutes of each other.

Consequently the data proved to be sufficiently accurate to provide reliable results for the gases targeted by these experiments.

Although the smoke effluent output from the burner appeared to be relatively clear (Ringleman Standard 1 to 2), the residual sample taken from the first (three spray) wash chamber was unexpectedly dark in comparison with the source water. This indicates that the activated water is actually removing carbon (and particulates) from the effluent. The residual sample from the second wash chamber was also dark, even though the temperature of the second wash chamber was considerably lower (approaching ambient) than the smoke effluent gases in the first chamber. This indicates that although the spray cools the smoke effluent, the effect of the activated treatment is not temperature dependent.

An experiment was also completed to identify the effects of using unactivated (i.e. regular tap) water on the flue gas from Black coal. The unactivated water cooled the flue gases similarly to the activated water and also captured some particulates, but there was no significant percentage change to the composition of the gases in the effluent.

These results indicate that the presence of a magnetic and electric field helps to solubilise aggregate, particulate, mineralogical and ionic matter that can react with the flue gas. For example, the solubility of calcite may increase which would increases the $Ca^{2+}$ and $CO_3^{2-}$ concentration in solution. Increases in $CO_3^{2-}$ helps in solubilising $CO_2$ in solution due to the higher pH and greater ability to form species such as $H_2CO_3$, which can dissociate to form bicarbonate which can then form precipitates such as calcium bicarbonates. This effectively shifts the partitioning coefficient of $CO_2$ between the gas phase and aqueous phase towards the aqueous phase. Although calcium is used as an example, many other mineralogical species, such as those found in scale in aqueous plumbing, can be solubilised and react with flue gas such as $CO_2$.

The activated water may also help to shift the partitioning coefficient for other gases such as NO, $NO_x$ and $SO_2$ towards the aqueous phase for similar reasons presented above.

The increase in the percentage of $O_2$ can be explained by the outgassing of $O_2$ dissolved in the activated water. Further, removal of $CO_2$ from the flue gas to form treated flue gas changes the composition of the treated flue gas, and this may change the partial pressures of each gas that makes up the treated flue gas. If the partial pressure of oxygen increases, then this would promote outgassing of $O_2$ dissolved in the activated water. Further, the high surface area of the activated mist and/or vapour in the flue helps to increase the amount of oxygen that is able to outgas from the activated mist and/or vapour. However, in some embodiments, the observed increase in $O_2$ is a result of removal of gases such as $CO_2$ and CO from the flue gas, which mean the same amount of $O_2$ now occupies a greater proportion of the resulting treated flue gas.

It should be appreciated that the specific mechanism by which the $CO_2$ and other gases are removed from the flue gas when treated by the activated water may vary depending on the specific composition of the flue gas and what solutes are present in the activated water.

TABLE 1 results from black coal

| Gas Measured | Control Smoke | With activated water | Percentage Change |
|---|---|---|---|
| $O_2$ | 20.7% | 21.1% | +1.93% |
| $CO_2$ | 0.30% | 0.00% | −100.00% |
| CO | 0.20% | 0.00% | −100.00% |
| NO (ppm) | 13 | 6 | −53.85% |
| $NO_x$ (ppm) | 13 | 6 | −53.85% |
| $SO_2$ (ppm) | 10 | 0 | −100.00% |

Diesel Fuel

Considerable difficulty was expected in obtaining control smoke data due to the high particulate content of diesel smoke rapidly obstructing the Unigas 3000+ filter. In the event, the filter, although very dirty, did not choke completely and meaningful results were obtained.

Nevertheless, these results are not considered definitive and improvements on the % change figures are anticipated with superior measuring equipment.

TABLE 2 results from Diesel Fuel

| Gas Measured | Control Smoke | With activated water | Percentage Change |
|---|---|---|---|
| $O_2$ | 17.9% | 20.7% | +15.64% |
| $CO_2$ | 2.20% | 0.20% | −90.91% |
| CO | 0.08% | 0.00% | −100.00% |
| NO (ppm) | 4 | 0 | −100.00% |
| $NO_x$ (ppm) | 5 | 0 | −100.00% |
| $SO_2$ (ppm) | 70 | 11 | −84.29% |

Brown Coal

The experiment with Brown coal followed the same process as the Black coal, but the smoke output was not as transparent. This may have to do with the higher water content of the fuel, so some of the perceived smoke may have actually been steam.

TABLE 3 results from Brown Coal

| Gas Measured | Control Smoke | With activated water | Percentage Change |
|---|---|---|---|
| $O_2$ | 17.50% | 20.7% | +18.29% |
| $CO_2$ | 2.50% | 0.20% | −88.00% |
| CO | 0.08% | 0.00% | −100.00% |
| NO (ppm) | 16 | 3 | −81.25% |
| $NO_x$ (ppm) | 19 | 4 | −78.95% |
| $SO_2$ (ppm) | 16 | 8 | −50.00% |

Bunker Oil

The Bunker oil would not ignite at the ambient temperature, so it had to be heated using traditional paraffin firelighters before it could be ignited. This is consistent with reports from shipping (where this is a major fuel source) where they have to keep this fuel above 130 Degrees C. for it to become combustible.

Once this was done, it burned very well but with a very dark (high soot/particulate) smoke output, which resulted in fouling the Unigas 3000+ filters soon after meaningful readings were obtained. Subsequent readings were considered suspect due to the evident fouling.

TABLE 4

| | results from Bunker oil | | |
|---|---|---|---|
| Gas Measured | Control Smoke | With activated water | Percentage Change |
| $O_2$ | 17.50% | 20.7% | +18.29% |
| $CO_2$ | 2.50% | 0.30% | −88.00% |
| CO | 0.08% | 0.01% | −87.50% |
| NO (ppm) | 31 | 14 | −54.84% |
| $NO_x$ (ppm) | 32 | 14 | −56.25% |
| $SO_2$ (ppm) | 351 | 60 | −82.91% |

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the method and system.

The invention claimed is:

1. A method of treating flue gas that has one or more components, the method comprising:
   passing a solution through an inside of a conduit
   generating an electric field between a first antenna and a second antenna of an electric field generator, wherein the first and second antennas are positioned on an outside surface of the conduit, thereby preventing direct contact with the solution passing through the inside of the conduit; and
   generating a magnetic field by a magnetic field coil of a magnetic field generator, wherein the magnetic field coil is positioned on the outside surface of the conduit between the first antenna and the second antenna, thereby preventing direct contact with the solution passing through the inside of the conduit;
   passing the solution through the electric field and the magnetic field to form an activated solution;
   contacting the activated solution with the flue gas so that the one or more components of the flue gas are at least partially absorbed by the activated solution to form a residue solution.

2. A method as claimed in claim 1, wherein the magnetic field has a magnetic flux density of between 0.01 μT to 1 mT.

3. A method as claimed in claim 1, wherein the electric field is in the form of an oscillating sinusoidal waveform, and wherein a first sinusoidal waveform generated at the first antenna is 180° out of phase with a second sinusoidal waveform generated at the second antenna.

4. A method as claimed in claim 1, wherein a frequency of the electric field ranges from 0.3 Hz to 100 MHz.

5. A method as claimed in claim 1, wherein the step of contacting the activated solution with the flue gas includes injecting the activated solution into the flue gas as a vapor and/or mist.

6. A method as claimed in claim 1, further comprising collecting the residue solution.

7. A method as claimed in claim 6, further comprising extracting the at least partially absorbed one or more components from the residue solution.

8. A method as claimed in claim 1, wherein the method is continuously repeated.

9. A method as claimed in claim 1, wherein the solution is water.

10. A method as claimed in claim 1, further comprising:
    forming the activated solution on an upstream solution side of a boiler;
    passing the activated solution through the boiler; and
    contacting the activated solution with the flue gas on a downstream solution side of the boiler.

11. A method as claimed in claim 1, wherein the activated solution is converted to steam, and wherein the steam is then contacted with the flue gas.

12. A method as claimed in claim 1, the first and second antennae respectively include first and second dipoles.

\* \* \* \* \*